C. M. AND J. E. MACKENZIE.

C. M. MACKENZIE, EXECUTRIX OF J. E. MACKENZIE, DEC'D.

FASTENER.

APPLICATION FILED AUG. 23, 1919.

Reissued Nov. 2, 1920. 14,975.

Inventors:
Cecilia M. Mackenzie,
Jessie E. Mackenzie,
deceased
by Emery, Booth, Janney & Varney
Attys

UNITED STATES PATENT OFFICE.

CECILIA MARGARET MACKENZIE, OF LONDON, AND JESSIE EVANGELINE MACKENZIE, DECEASED, LATE OF LONDON, ENGLAND, BY CECILIA MARGARET MACKENZIE, EXECUTRIX, ASSIGNORS TO CARR FASTENER COMPANY, OF CAMBRIDGE, MASSACHUSETTS, A CORPORATION OF MAINE.

FASTENER.

14,975. Specification of Reissued Letters Patent. Reissued Nov. 2, 1920.

Original application filed November 22, 1913, Serial No. 802,527. Renewed September 7, 1918, Serial No. 253,079. Original No. 1,283,245, dated October 29, 1918. Application for reissue filed August 23, 1919. Serial No. 319,499.

*To all whom it may concern:*

Be it known that CECILIA MARGARET MACKENZIE, a subject of the King of Great Britain and Ireland, and now residing at No. 20 Tavistock road, in the county of London, England, and JESSIE EVANGELINE MACKENZIE, now deceased, formerly a subject of the King of Great Britain and Ireland, and late of No. 35 Dover street, in the county of London, England, invented certain new and useful Improvements in and Relating to Fasteners, of which the following is a specification.

This invention relates to spring fasteners, especially of the type usually known as glove fasteners or press studs which are largely used for fastening materials or garments of many kinds.

Ordinary press stud fasteners as used in large numbers have the disadvantage that when the garments to which they are applied are tight the fasteners are easily unfastened at the wrong time, although the springs are sufficient to retain the fastening when the garments are loose.

Special arrangements of spring studs have been proposed but we have found by experiment that they have disadvantages; either they are intended for loose garments and become undone if subjected to much stress or they can only be applied on garments which keep them in a state of stress, becoming undone if the garments be loose; or again, difficulty occurs in fastening and unfastening.

According to our invention by which these difficulties are overcome, we take a press stud of ordinary form with a central dome through which springs project tending to keep the other part of the stud in the center of the dome and drill or otherwise cut a small hole through the dome at a place in the edge and through the base plate. We find in this way that with loose garments the improved stud acts as an ordinary stud and is used as such, the additional hole having practically no effect; with tight garments or when stresses occur, although the stud is fastened and unfastened as an ordinary stud, yet the hole catches the head of the other part of the stud and serves to give a secure fastening.

Referring to the accompanying diagrammatic drawings:—

Figure 1:
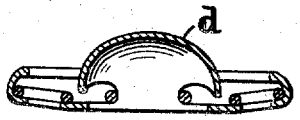
Figure 2:
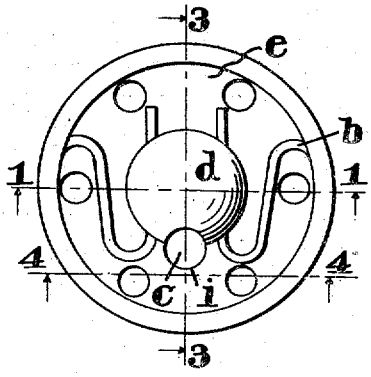

Figure 1 is a section (on the line 1—1 of Fig. 2) of one element of a press stud, and Fig. 2 is a plan corresponding thereto.

Figure 3:
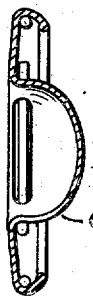
Figure 4:
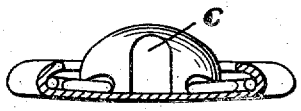

Figs. 3 and 4 are sections on the lines 3—3 and 4—4 respectively of Fig. 2.

Figure 5:
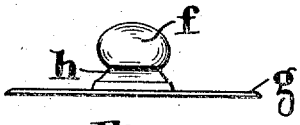
Figure 6:
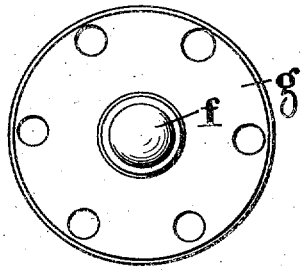

Figs. 5 and 6 show the other element in elevation and plan respectively.

The drawings, which illustrate one manner of carrying the invention into effect, show a press stud of well known form except that a small hole *c* is drilled partly through the crown *d* and partly through the flange *e*. The hole may be of different shape to that shown; it may be formed otherwise than by drilling.

In use the head *f* of the lower member *g* is pushed into the crown *d* past springs *b* exactly as with the usual fastener.

When stresses occur in the material, instead of the fastener being pulled open the head *f* is drawn into the hole *c* where it is practically unacted upon by the springs *b* but where it becomes securely locked because the head *f* cannot pass through the hole which is made of sufficiently small diameter, and the neck *h* of the head engages with the edge *i* of the hole. In this way central entry of the head *f* is obtained and slight motion is permitted after fastening, giving a press stud which is easy to fasten and which does not become unfastened in use.

It will be quite well appreciated that this particular formation is given as an example only and may be modified.

Having now described our invention, what we claim as new and desire to secure by Letters Patent is:—

1. A spring element of a spring press stud with a central dome, spring wires extending therethrough parallel to each other and to a diameter and situate on each side of the aforesaid diameter, the dome being perforated at its edge on the same diameter.

2. A spring element of a spring press stud with a dome and a flange, spring wires extending through the dome parallel to each other and to a diameter and situate on each side of the aforesaid diameter, a small hole being cut in part at the edge of the dome on the same diameter and in part in the flange contiguous thereto.

3. A spring element of a spring press stud with a central dome, a flange and a turned-over rim, a spring wire held in the rim, the two ends extending through the dome parallel to each other and to a diameter and situate on each side of the aforesaid diameter, and a small hole being cut in part through the edge of the dome and in part through the flange adjacent thereto on the same aforesaid diameter.

4. A stud and socket fastener comprising a symmetrical stud having a head and a neck, a socket having a plate provided with an aperture to pass the stud and spring means for engaging the neck to retain the stud, said plate also having an aperture communicating with the first, the communicating opening being less than the diameter of the neck.

5. A stud and socket fastener comprising a symmetrical stud having a head and a neck, a socket having a plate provided with an aperture to pass the stud, opposed springs for engaging the neck to retain the stud, said plate also having an aperture communicating with the first between the springs, the communicating opening being less than the diameter of the neck.

6. A stud and socket fastener comprising a symmetrical, headed stud and a coöperating socket having an opening providing a passage for said head, spring means adjacent the opening to engage the neck, said opening having a narrowed lateral extension providing a wedging engagement with the neck of the stud when the stud is drawn laterally of the socket.

7. A stud and socket snap fastener comprising a stud having a head and a neck, the under side of said head sloping gently toward the neck, and a socket of the dome type having the dome partially cut away to provide edges interlocking with the under side of the head of said stud under lateral strain between stud and socket but proportioned to limit displacement of said fastener and permit it to be separated by direct axial strain between stud and socket.

8. A stud and socket fastener comprising a stud having a head and a neck and a socket of the dome type providing interiorly of the dome means for interlocking the head of the stud at spaced points under lateral strain but proportioned to release the head to a direct axial strain.

9. A stud and socket fastener comprising a headed stud, a socket having a centric group of resilient stud-engaging means and having an opening to pass the stud when presented centrally to said group, said opening having an extension providing marginal portions interlocking with the head of the stud under lateral strain while leaving the same also held by the resilient means.

10. A stud and socket fastener comprising a headed stud, a socket having a centric group of resilient stud-engaging means and having an opening to pass the stud when presented centrally to said group, said opening having an extension partially to receive the stud and interlock on yielding of said means under lateral strain but proportioned to release the stud on direct axial strain.

11. A stud and socket snap fastener comprising a stud having a head and a sloping shoulder behind said head, a socket having resilient means for engaging the stud and a plate with an opening providing access of the stud to said means, said opening having a narrowed lateral portion wedgingly to engage the under side of the head of the stud on lateral strain.

12. A stud and socket snap fastener comprising, in combination, a stud and a socket having an opening to receive the same and providing means to engage the under side of the head of the stud at the extremities of a chord of a transverse section therethrough when the stud is drawn laterally of the opening in the socket, said stud and socket separable by relative tipping movement of greater angularity than that produced by the resolution of forces under lateral strain.

13. A stud and socket fastener comprising, in combination, a stud having a head and a neck and a socket plate having an opening to pass the head and providing points to engage the neck at the extremities of a chord thereof when drawn laterally.

14. A stud and socket fastener comprising a headed stud and a coöperating socket having an opening providing a passage for said head, which opening has a relatively restricted lateral extension in which the stud may enter but not seat under lateral strain.

15. A stud and socket fastener comprising a stud and a coöperating socket having one or more retaining springs for said head and having an opening providing a passage for said head, which opening presents marginally projections for bearing at spaced points on the stud when the latter is drawn thereagainst by lateral strain.

16. A stud and socket fastener comprising a headed stud and a socket having spring means for retaining the stud, said socket including a plate having an opening through which the stud may be passed to engage said spring, said plate also having a recess marginally of said opening to receive the stud under lateral strain, said recess being so restricted in size as to permit the stud to be drawn therefrom and from the socket by direct axial strain.

In testimony whereof the said CECILIA MARGARET MACKENZIE has signed her name hereto, in her own behalf and as executrix of the said JESSIE EVANGELINE MACKENZIE.

CECILIA MARGARET MACKENZIE.

*For herself and as executrix of Jessie Evangeline Mackenzie, deceased.*